Sept. 12, 1967 R. J. LURIE 3,340,572

MULTI-STRAND EXTRUDING DIE

Filed Jan. 5, 1966

ROBERT J. LURIE
INVENTOR.

BY
Richard A. Dannella, Jr.
ATTORNEY

United States Patent Office 3,340,572
Patented Sept. 12, 1967

3,340,572
MULTI-STRAND EXTRUDING DIE
Robert J. Lurie, Morristown, N.J., assignor to Rexall Drug and Chemical Company, Los Angeles, Calif., a corporation of Delaware
Filed Jan. 5, 1966, Ser. No. 518,811
2 Claims. (Cl. 18—8)

ABSTRACT OF THE DISCLOSURE

The extruding die axially directs molten thermoplastic from a plenum chamber having a conical outlet, through passageways which radiate outwardly from the outlet and intersect its apex, and through die orifices. The passageways are parallel and coextensive to the outlet's surface to prevent stagnant thermoplastic pockets from forming.

---

This invention relates to an extrusion die for thermoplastic materials, and more particularly, to an improved multi-strand extrusion die having improved material flow characteristics.

Extrusion dies for thermoplastic material are widely known in industry where a die member is adapted to simultaneously extrude a plurality of continuous thermoplastic strands from a plurality of die orifices. A problem usually encountered in connection with the use of dies of this particular type is the accumulation of the thermoplastic material in "dead spots" or pockets within the die member. This, of course, results in stagnation of the accumulated material and in the subsequent deterioration of the thermoplastic material being extruded. A further problem encountered in prior art die members is an unequal flow distribution of the thermoplastic material to the various die orifices. This is generally attributable to the construction of prior art dies which present abrupt directional flow changes of the flowing material in the die extruding passages. In particular, prior art dies are of the typical "fishtail" type multi-strand construction, wherein a single plenum chamber feeds the inlet to a number of passageways which lead to the multi-strand die orifices. The axes of the passageways are parallel and in a single plane.

The plenum chamber is immediately adjacent the row of inlets to the parallel passageways and permits the accumulation of thermoplastic material. The accumulated material is then forced through the passageways and extruded through the die orifices. It is this accumulated material that frequently stagnates causing the deterioration of the material and thereby causing contamination of subsequent thermoplastic material being extruded through the die member.

Additionally, the prior art extrusion dies are so designed that the thermoplastic material must make abrupt changes in flow direction as the material is forced from the plenum chamber into one of the parallel passageways. This frequently results in an unequal distribution of the material to the various parallel passageways leading to the die orifices. Consequently, this may produce undesirable variations in the diameters of the extruded thermoplastic strands.

The extrusion die according to this invention overcomes the foregoing problems encountered in the prior art through elimination of pockets in the die member where thermoplastic material may accumulate. Furthermore, the present extrusion die avoids abrupt and excessive changes in the direction of flow of the thermoplastic material being extruded, thereby assuring an adequate and equal flow of the material to all of the multi-strand die orifices.

Accordingly, it is a primary object of this invention to provide an improved multi-strand extrusion die for thermoplastic material.

Another object of this invention is to provide an extrusion die wherein thermoplastic material is supplied to a plurality of die orifices from a single plenum chamber without accumulation of thermoplastic material in the die.

Yet another object of this invention is to provide an improved and novel extrusion die wherein thermoplastic material is permitted to flow uniformly and equally to a plurality of die orifices from a single plenum chamber in the die.

A still further object of this invention is to provide an extrusion die wherein thermoplastic material is distributed to a plurality of die orifices from a single plenum chamber without abrupt changes in the flow direction of the thermoplastic material.

In accordance with the present invention, the extrusion die includes a plenum chamber having an inlet and an outlet, and a plurality of passageways intersecting said outlet and extending radially outward therefrom whereby molten thermoplastic material is directed through multi-strand extruding die orifices without accumulation in the die. Preferably the passageways are circumferentially spaced at equal angular projections about the longitudinal axis of the plenum chamber. It is this symmetrical orientation of the passageways that permits equal flow of thermoplastic material from the plenum chamber to the die orifices without a significant or detrimental change in the flow direction of the material.

The present invention will be more easily understood and other objects and advantages thereof will become apparent when the following detailed description is read in conjunction with the accompanying drawings, in which.

Figure 1:
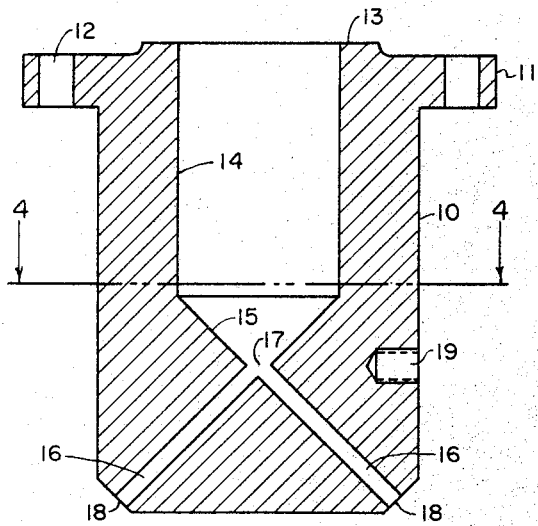
FIG. 1 is an elevational view in section of the extrusion die according to this invention.
Figure 3:
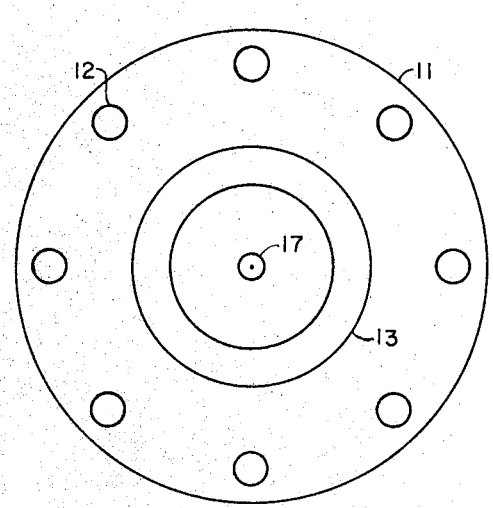
FIG. 3 is a plan view of the other end of the extrusion die as shown in FIG. 1.
Figure 2:
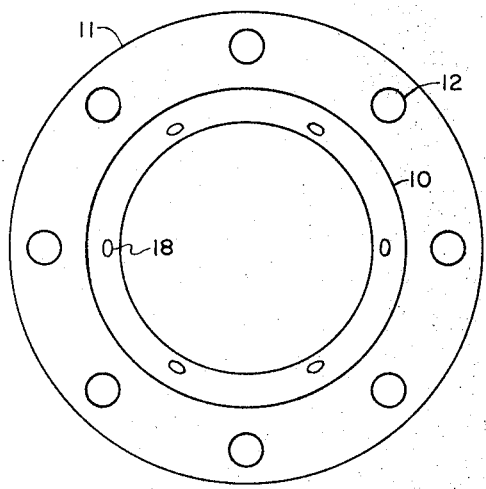
FIG. 2 is a plan view of one end of the extrusion die as shown in FIG. 1.
Figure 4:
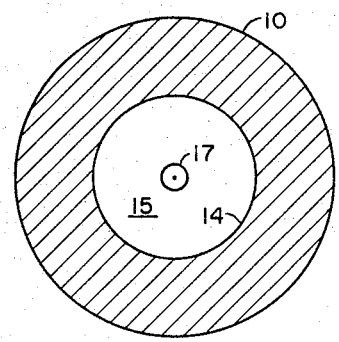
FIG. 4 is a sectional view on line 4—4 of FIG. 1.

Referring now in particular to the drawings, the present device includes a die member 10 which is adapted to be attached to an extrusion apparatus (not shown). For this purpose a flange 11 may be provided on die member 10, and with flange 11 having a series of bolt holes 12 therein. A raised lip portion 13 on flange 11 which has a smooth polished surface affords a sealing surface when placed in contact with a mating surface on an extrusion apparatus.

A bore or plenum chamber 14 is provided in die member 10, extending at one end into a gradually narrowing substantially conical outlet portion 15. In order to facilitate the smooth, relatively frictionless flow of the thermoplastic material through plenum chamber 14 and conical portion 15, their surfaces should be of a relatively smooth, polished finish.

Each of a plurality of passageways 16 extends through the lower portion of die member 10 and intersects the narrowest constriction or apex 17 of conical portion 15 at one end thereof. The other end of each of passageways 16 forms one of die orifices 18 for the extrusion of the thermoplastic material. Similar to the surfaces of plenum chamber 14 and conical portion 15, passageways 16 should have surfaces which are smoothly bored so as to offer practically no impediment to the flow of the thermoplastic material therethrough. The edge of die member 10 on which die orifices 18 are positioned may be chamfered to be perpendicular or normal to the direction of passageways 16.

Passageways 16 are preferably circumferentially spaced about plenum chamber 14 and conical portion 15 at equal angular spacings and projections to assume an equal distribution of thermoplastic material flowing from plenum chamber to each of the pasageways. Passageways 16 extend from their intersection with apex 17 to die orifices 18 in directions which are parallel and coextensive with the surface generated by conical portion 15. This feature permits the thermoplastic material being extruded to flow from conical portion 15 into passageways 16 without an appreciable change of flow direction. Consequently, sharp corners and sudden directional changes in the flow of the material are avoided, thus assuring a smooth-flowing uninterrupted supply of thermoplastic extrudate. However, no significant or detrimental change in flow direction occurs even if the passageways are not parallel and coextensive so long as they are not substantially perpendicular to the surface of conical portion 15.

A further feature in having passageways 16 intersect apex 17 of conical portion 15 is that there is no area or space where thermoplastic material may collect, stagnate and decompose in die member 10.

A tap 19 may be provided in the outer wall of die member 10 to facilitate the connection thereto of a thermocouple. This will permit an operator to almost instantaneously ascertain the termperature of the thermoplastic material flowing through die member 10, and if necessary, adjust it as required.

Although die member 10 is shown to have six passageways 16 for the extrusion of six simultaneous strands of thermoplastic material, this is merely illustrative and not to be considered limiting. Any desired number of passageways may be provided as required, limited only by the capacity of the extrusion die member, or depending on the thickness of the individual extruded thermoplastic strands desired.

In essence, the present extrusion die thus is of a particularly simple and advantageous construction, avoiding areas where thermoplastic material may collect and stagnate, and facilitating the extrusion of continuous strands of the material without excessive and detrimental changes in flow direction through the die.

While particular embodiments of this invention are shown above, it will be understood that the invention is obviously subject to variations and modifications without departing from its broader aspects.

What is claimed is:
1. In a multi-strand extruding die, means for axially directing a mass of molten thermoplastic material through a plurality of die orifices, the axial directing means comprising a plenum chamber having an inlet and a gradually narrowing substantially conical outlet portion, and a plurality of passageways extending radially outward from said outlet portion, one end of each of said passageways intersecting said outlet portion at its apex and the other end of each of said passageways forming one of said die orifices, said passageways being in a substantially parallel and coextensive relationship to the surface of said outlet portion.

2. In a multi-strand extruding die, means for axially directing a mass of molten thermoplastic material through a plurality of die orifices, said axial directing means comprising a generally cylindrical plenum chamber having an inlet and a gradually narrowing substantially conical outlet portion, and a plurality of passageways extending radially outward from said outlet portion, one end of each of said passageways intersecting said outlet portion at its apex and the other end of each of said passageways forming one of said die orifices said passageways being in a substantially parallel and coextensive relationship to the surface of said conical outlet portion and circumferentially spaced at equal angular projections about the longitudinal axis of said plenum chamber.

References Cited
UNITED STATES PATENTS

| | | | |
|---|---|---|---|
| 1,453,048 | 4/1923 | Kraft et al. | 18—855 |
| 2,848,737 | 8/1958 | Poetter et al. | 18—855 |
| 2,923,970 | 2/1960 | Genovesse | 18—12 X |
| 3,014,237 | 12/1961 | Breen | 18—12 X |
| 3,016,568 | 1/1962 | Gagne | 18—12 X |

WILLIAM J. STEPHENSON, *Primary Examiner.*